United States Patent [19]

Faivre et al.

[11] Patent Number: 5,843,307

[45] Date of Patent: Dec. 1, 1998

[54] UNIT FOR THE TREATMENT OF WATER BY OZONIZATION, AND A CORRESPONDING INSTALLATION FOR THE PRODUCTION OF OZONIZED WATER

[75] Inventors: Michel Faivre, Acheres; Nathalie Martin, Paris; Vincent Boisdon, Clairmarais, all of France

[73] Assignee: Gie Anjou Recherche, Paris, France

[21] Appl. No.: 682,750

[22] PCT Filed: Jan. 26, 1995

[86] PCT No.: PCT/FR95/00085

§ 371 Date: Sep. 11, 1996

§ 102(e) Date: Sep. 11, 1996

[87] PCT Pub. No.: WO95/20543

PCT Pub. Date: Aug. 3, 1995

[30] Foreign Application Priority Data

Jan. 26, 1994 [FR] France ................................. 94 01049

[51] Int. Cl.$^6$ ............................... C02F 1/78; B01D 31/00
[52] U.S. Cl. .................... 210/192; 210/760; 422/186.08; 422/186.11; 422/186.12
[58] Field of Search .................. 210/760, 192, 210/928; 162/161, 190; 422/24, 186.3, 186.08, 186.14, 186.11, 186.12; 261/121.1, DIG. 75, 77

[56] References Cited

U.S. PATENT DOCUMENTS

| | | | |
|---|---|---|---|
| 2,812,861 | 11/1957 | Bickford | 210/192 |
| 2,970,821 | 2/1961 | Axt | 210/760 |
| 3,699,776 | 10/1972 | La Raus | 210/760 |
| 3,823,728 | 7/1974 | Burris | 210/760 |
| 4,049,552 | 9/1977 | Arff | 210/760 |
| 4,132,637 | 1/1979 | Key et al. | 210/760 |
| 4,136,027 | 1/1979 | Sakamoto et al. | 210/760 |
| 4,252,654 | 2/1981 | Leitzke et al. | 210/760 |
| 4,255,257 | 3/1981 | Greiner et al. | 210/760 |
| 4,453,953 | 6/1984 | Tanaka et al. | 55/163 |
| 4,627,924 | 12/1986 | Coste | 210/760 |
| 4,696,739 | 9/1987 | Pedneault | 210/192 |
| 4,767,528 | 8/1988 | Sasaki et al. | 210/192 |
| 4,795,557 | 1/1989 | Bourbigot et al. | 210/221.2 |
| 5,114,576 | 5/1992 | Ditzler et al. | 210/195.1 |

(List continued on next page.)

FOREIGN PATENT DOCUMENTS

| | | |
|---|---|---|
| 0459928 | 4/1991 | European Pat. Off. . |
| 0436409 | 10/1991 | European Pat. Off. . |
| 0550152 | 7/1993 | European Pat. Off. . |
| 3149681 | 2/1982 | Germany . |
| 61291097 | 12/1986 | Japan . |
| 2023565 | 3/1980 | United Kingdom . |

OTHER PUBLICATIONS

Environmental Science and Technology., vol. 12, Easton, PA US, p. 470 R.D. Neufeld et al, (1978) "Ozanation of coal gasification plant wastewater" see p.470, left column, last paragraph–right column, line 3; figure 2.

Primary Examiner—Cynthia L. Nessler
Attorney, Agent, or Firm—Merchant, Gould, Smith, Edell, Welter & Schmidt

[57] ABSTRACT

A unit for the treatment of water by ozonization including, on the one hand at least one apparatus for the production of ozonized white water and, on the other hand, at least one contactor in a way that the mixing of the water to be treated and the white water occurs in said contactor. The installation for the production of ozonized white water includes a device for dissolution of ozone under pressure in a carrier liquid. In a first embodiment, allowing the treatment of high flows, a portion (typically 5 to 15%) of the main flow of the fluid to be treated is diverted to the vessel for the production of ozonized white water according to the invention, then reintroduced into the main flow within a contactor allowing the whole flow to be treated. In a second embodiment, corresponding more to the treatment of comparatively lower flows, the total flow of fluid is treated directly in the vessel for the production of ozonized white water.

20 Claims, 4 Drawing Sheets

U.S. PATENT DOCUMENTS

| | | | |
|---|---|---|---|
| 5,167,806 | 12/1992 | Wang et al. | 210/188 |
| 5,178,755 | 1/1993 | La Crosse | 210/195.1 |
| 5,240,600 | 8/1993 | Wang et al. | 210/188 |
| 5,271,830 | 12/1993 | Faivre et al. | 210/151 |
| 5,275,732 | 1/1994 | Wang et al. | 210/601 |
| 5,275,742 | 1/1994 | Satchell, Jr. et al. | 210/760 |
| 5,336,413 | 8/1994 | van Staveren | 210/760 |
| 5,376,265 | 12/1994 | Szabo | 210/188 |
| 5,399,261 | 3/1995 | Martin et al. | 210/195.1 |
| 5,409,616 | 4/1995 | Garbutt et al. | 210/192 |
| 5,417,852 | 5/1995 | Furness, Jr. et al. | 210/192 |
| 5,427,693 | 6/1995 | Mausgrover et al. | 210/739 |

UNIT FOR THE TREATMENT OF WATER BY OZONIZATION, AND A CORRESPONDING INSTALLATION FOR THE PRODUCTION OF OZONIZED WATER

FIELD OF THE INVENTION

This invention relates to treatments of water by ozonization and more particularly the development of a principle of a unit for the treatment of water by ozonization including an installation for the production of ozonized fluid.

BACKGROUND OF THE INVENTION

The use of ozone, particularly in water treatment processes, as a bactericidal and virulicidal agent has been known for a long time. This compound is also used in water purification systems during combined ozonization-coagulation, ozonization-flotation, ozonization-adsorption treatment stages on filtering media (with the possibility of biological action on the filter) without forgetting more classic applications such as the removal of iron and manganese or the removal of colour, of tastes and odours from treated waters. Finally it is known that ozone has an oxidising action on a certain number of micro-pollutants (phenols, certain detergents, . . . ) (see B. Langlais, "Nouveau développement de l'ozonation en eau potable et technologie appropriée", L'eau; l'industrie, les nuisance, n°109, April 1987, pp. 28 to 30).

So as to encourage contact of gaseous ozone with the treated effluent, it is usual to use mixers of various types. These mixers can comprise injection systems such as porous devices, pressure reducing diffusers, emulsifiers (still called filter pumps or hydro-injectors), by static mixers or by dynamic mixers (for example an agitator or a motor driven turbine).

These known mixers are generally situated upstream of contact tanks (contactors) designed in such a way that the oxidising gas is kept in contact with the flow of liquid to be treated for a predetermined period of time.

By way of an example, French patent FR 2662616 describes an installation including, for example, in succession, a transfer device for adding an oxidising gas such as ozone to the liquid to be treated, a module for the forced dissolution of ozone in the liquid and a contactor module. The forced dissolution module described in this document comprises a tank including a first central chamber forming a shaft for the exhaustion of the gases, and a second annular recirculation, chamber coaxial with the exhaust shaft. The two chambers are separated by an internal wall and there is communication between them at their upper and lower parts so that recirculation of the treatment medium is permitted by cyclically passing from one to the other.

These different types of devices have a certain number of disadvantages. Hence in order to ensure a minimum contact necessary time for all of the liquid to be treated, a high mean passage time must be maintained in the reactors. This requires structures which are over-sized, costly and take up a lot of space. Furthermore, they generally do not allow good homogeneity in the distribution of oxidising gas in the treated medium.

The objective of this invention is to provide an installation that allows an ozonized treatment fluid to be supplied that enables optimisation of the contact of the ozone with a liquid to be treated such as water.

Another objective of the invention is to propose such an installation with high output.

Yet another objective of the invention is to provide a water treatment unit equipped with such an installation requiring a reduced volume and optimised for civil engineering.

Another objective of the invention is to provide such a unit allowing the treatment of the water to be maximised and homogenised, particularly with the purpose of allowing its disinfection and the flotation of the organic materials that it contains with the help of the ozonized fluid formed.

Yet another objective of the invention is to provide such a unit with a minimised passage time in the reactors for the liquid to be treated whilst keeping to the minimum contact times.

A particular objective of the invention is to allow the release into the treated water of micro-bubbles of ozone having a size between about 20 microns and 200 microns thanks to the introduction, into the treated medium of a fluid being in the form of ozonized white water.

It should be remembered that the term "white water" is used in the technology to designate a mixture of water and nascent air obtained by the depressurising of a pressurised fluid made up of a mixture of air and water in equilibrium with a determined pressure. The white colour of the water thus obtained refers to the colour that the mixture takes at the moment the air is depressurised.

It has already been suggested in the state of the technology to use white water for the back blowing of membranes used in the context of micro-filtration or ultra-filtration of water. Hence, French patent application No. 9109803 describes a back blowing method that includes a step consisting of causing a mixture of water and air under pressure to pass through the membrane as a flow contrary to the direction of filtration placing the supply chamber under a sudden negative pressure with respect to the permeate recovery chamber The pressure reduction, particularly inside the pores of the membrane enables it to be back blown.

Hence the invention has an objective of allowing the production of an ozonized white water formed during the reduction of pressure of a mixture of ozone and air at equilibrium with a predetermined pressure. It should be noted that when such a mixture has not been used, ozone involves handling conditions which are significantly more restricting than when air is used.

A particular objective of the invention is to suggest an interesting application of such a fluid consisting of using it in the context of the treatment of a water to be purified in order to allow the flotation of organic materials that are contained in it.

SUMMARY OF THE INVENTION

These different objectives as well as others that will appear in the following, are achieved thanks to the invention which relates to a unit for the treatment of water by ozonization characterised in that it includes on the one hand at least one installation for the production of ozonized white water and, on the other hand at least one contactor in such a way that the mixture of water to be treated and the white water is made in said contactor, said installation and said contactor being constituted by separate reactors connected via a duct and in that said installation for the production of ozonized white water includes means for dissolution under pressure of ozone in a carrier liquid, said means of dissolution being made up of a pressurisation vessel having an inlet for said carrier liquid, an inlet for ozone, an outlet under pressure of the fluid product and means of ensuring the regulation of the pressure inside said vessel and the continuous leakage of the gasses that did not dissolve in said carrier liquid, the contactor comprising pressure reduction means for ozonized white water provided by the pressurised output of said production installation of ozonized white water, said pressure reduction means being provided upstream said contactor. It should be noted that in certain embodiments, the ozone inlet and the carrier liquid inlet to the pressurisation vessel can be merged, particularly when the pressurisation vessel includes a static mixer.

This pressurisation vessel will advantageously be selected from the group made up of the ejector columns, the ejector columns and static mixer, the bubble columns, the bubble columns using the air lift phenomenon and the mechanically agitated bubble columns.

Such an installation allows an ozonized fluid to be supplied which, when its pressure is reduced, can give bubbles of ozone gas with an extremely small diameter which allows a very large contact surface between the ozone and the treated fluid. The increase in interface between the ozone and the fluid, compared with classic ozonization techniques, allows the effectiveness of this compound to be increased in a significant fashion and allows a notable reduction in the contact time necessary for its use. In practice, such an installation can supply an ozonized white water whose graded micro-bubbles have a size particularly between 20 and 200 micrometers.

Preferably, said means allowing regulation of the pressure in said vessel includes a discharger. Such a device allows a particular pressure to be maintained in the pressurisation vessel by the use of a continuous leakage of the gasses which have not dissolved in the carrier liquid. The maintenance of this pressure thereby allows the optimisation of the dissolution of ozone in this liquid up to its saturation while avoiding the accumulation of undissolved ozone inside the pressurisation vessel. It should however be noted that elements other than a discharger can also be used as pressure regulation means, for example a pressure reducer or a motorised valve controlled by a pressure measurement.

Equally preferably, said pressurisation vessel has a carrier liquid diffuser in its upper part and a gaseous ozone diffuser in its lower part, said carrier liquid and ozone passing through said pressurisation vessel in counter current and the fluid product outlet being provided in the lower part of said pressurisation vessel. The carrier liquid diffuser can particularly comprise a sprinkler unit while the gaseous ozone diffuser can comprise a porous device or a diffusion device that ensures homogeneous distribution of the gas over the cross section of the vessel.

Advantageously, said pressurisation vessel includes a packing material that encourages the transfer of the gaseous ozone into said carrier liquid. Such a packing material can particularly be in the form of rings in bulk such as Pall type rings. Such rings have openings which reduce the resistance to gaseous flow and permit a much reduced pressure drop for the liquid passing through the pressurisation vessel. The material transfer is improved by better access to the inside of the rings.

Equally advantageously, the installation includes means of regulating the height of liquid in said pressurisation vessel.

According to an interesting variant of the invention, said regulation means include a control valve provided upstream of said carrier liquid inlet, a level detector provided in the lower part of said pressurisation vessel and means for transmitting measurements taken by said detector to said control valve. Such transmission means may comprise a transmitter.

Preferably, the installation includes, in addition, an ozone generator and means of compression and aspiration of the ozone formed in said ozone generator. Such an ozone generator can comprise any device which allows the production of ozone from oxygen in a carrier gas (gas or other mixture).

Equally preferably, said means of compressing ozone are connected to a flow tank provided upstream of said compression means, said flow tank allowing the fluctuations in flow and sudden concentration changes at the ozone generator outlet to be smoothed out.

Advantageously, the installation also includes a blow off loop provided between said compression means and said flow tank, said loop allowing the removal of load downstream of said compression means and the variation of flow within a desired range. Such a loop also allows one to avoid start up of the compressor under load.

Preferably, said pressurisation vessel is fitted with means for the recirculation of a part of the carrier liquid from the outlet under pressure to the inlet of said vessel.

Equally advantageously, said means of pressure reduction are chosen from the group comprising cavitators and spray nozzles.

According to an interesting variant of the invention, said compression means are chosen from the group comprising membrane compressors, dry compressors and liquid ring pumps.

Equally according to a variant of the invention, the installation also includes means of measuring the dissolved ozone in the fluid under pressure which leaves said pressurisation vessel.

The installation comprises advantageously, in addition, means of cooling the gases before their introduction into the vessel. In a preferred way, these means of cooling the gasses before their introduction into the vessel are made up of an exchanger supplied with a heat transfer fluid coming from another exchanger which recovers the cold released by the gasification of liquid oxygen.

Preferably, said contactor belongs to the group that includes separation reactors (particularly and including those with membranes), back blowing reactors (particularly filtration membranes), and in particular flotation and/or ozoflotation reactors. In the case of a flotation reactor, this can operate at atmospheric pressure and be, for example fitted with laminae or bubble traps. It should be noted however that the contactor used may equally well operate under pressure. The pressure prevailing in this unit must, however be less than the pressure of the fluid leaving the pressurisation vessel so as to allow the formation of the ozonized white water.

Advantageously, said contactor is fitted with a pipeline allowing the pressurisation vessel to be supplied with the water coming out of said reactor acting as carrier liquid. It is thereby possible to use a part of the treated water as the liquid supplied to the pressurisation vessel. Preferably, filtration means (not shown) are provided in said pipeline.

The treatment unit advantageously includes means of destroying or recycling residual gaseous ozone coming from said contactor and/or said vessel for the production of ozonized white water It is of course also possibleto carry out the advanced oxidation methods by adding an additive, particularly hydrogen peroxide $H_2O_2$, a catalyst, and/or carrying out the treatment under UV radiation.

BRIEF DESCRIPTION OF THE DRAWINGS

The invention as well as the different advantages that it has, will be more easily understood with the help of the description that will follow of a non-limitative example of implementation of it with reference to the drawing, in which.

DETAILED DESCRIPTION OF THE INVENTION

Figure 1:
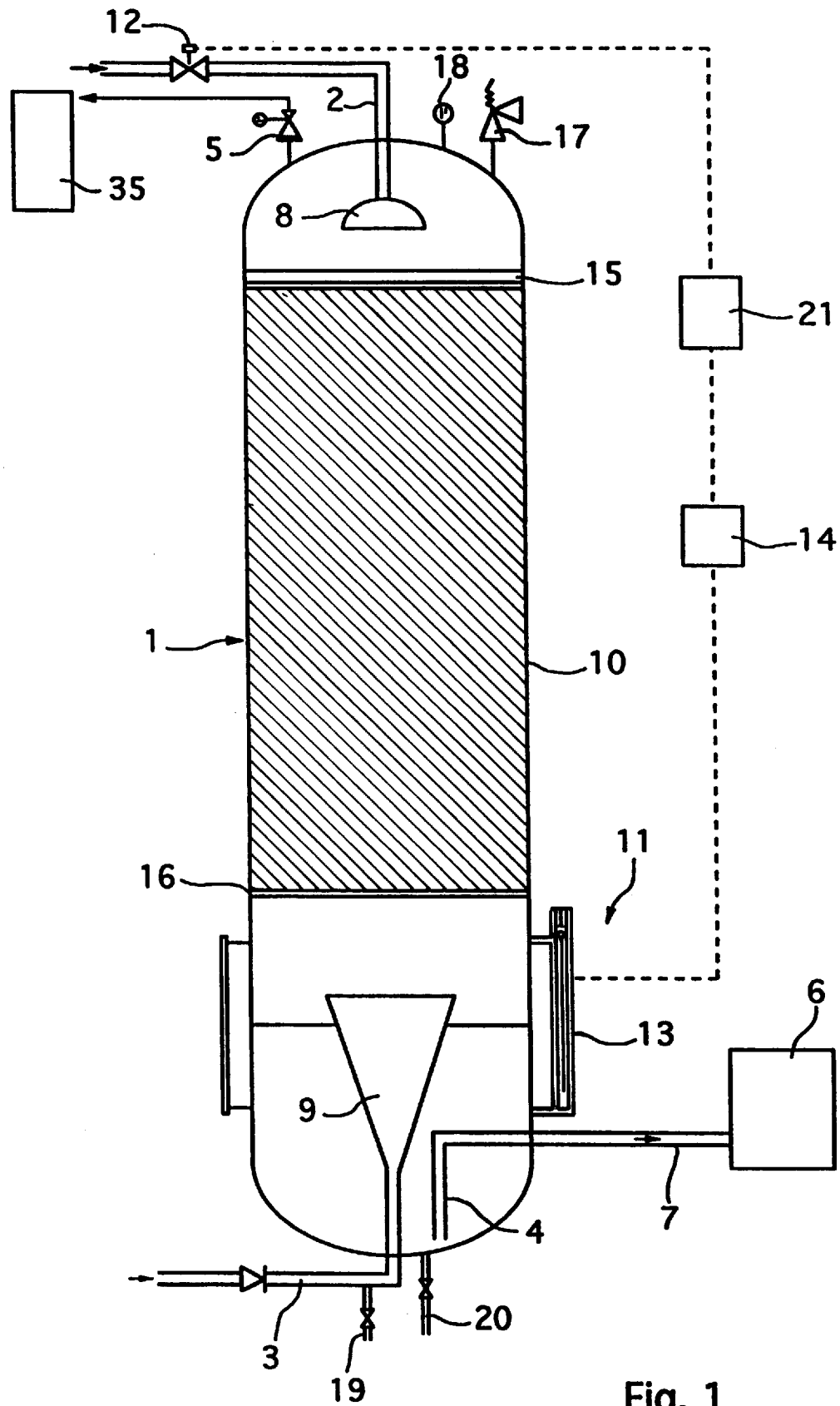
FIG. 1 shows a unit for the production of white water.

With reference to FIG. 1, an installation for the production of white water according to the invention is essentially made up of a pressurisation vessel 1 that permits the supply of a fluid under pressure and a means 6 of reducing the pressure of this fluid under pressure allowing the formation of ozonized white water.

The solution of carrying out the transfer, in a reactor under pressure, from a compressed ozonized gas, has been chosen rather than an aspiration of ozonized gas by a Venturi type emulsifier which does not allow one to work with gas/liquid ratios that are sufficiently high and have acceptable load losses.

Vessel 1 forms an absorption column and, so as to obtain maximum dissolution of the ozone in the water with the help of this gas-liquid contactor with a minimum of loss, a packed column has been chosen that operates under dewatering conditions. The water and the gas circulate in counter current and the ozone impoverished gas is continuously evacuated from the head of the saturation vessel.

The pressurisation vessel is fitted with an inlet 2 for the liquid destined to be saturated with ozone. Such a liquid is advantageously water. The vessel 1 has, in addition, in its lower part, a gaseous ozone inlet 3 and an outlet 4 for the fluid saturated with ozone under pressure. So as to allow a good distribution of carrier liquid inside the vessel 1, a distribution device 8 having the form of a sprinkler unit is installed at the inlet 2. Furthermore, the homogeneous distribution of the ozone over the whole cross section of the vessel is ensured thanks to a porous sintered device 9.

Advantageously, one can provide for the gases to be cooled prior to their introduction into the vessel 1. Lowering the temperature of the gases (without of course going lower than the freezing point) allows the size of the bubbles to be reduced and the solubility of the ozone to be raised which improves the transfer efficiency. The cooling means can comprise a pressure reducer or an exchanger 101 supplied with a heat transfer fluid. In a way that rationalises the energy required to operate the process, it can be advantageous to cool the heat transfer fluid by making use of the cold situated in another point of the treatment unit. Hence the ozone production chain generally has means for reheating oxygen coming out of bottles 104 (before the storage of the oxygen in the vessel 37 upstream of the ozone generator 30—see FIG. 2) which can be coupled to an exchanger 103 used to cool the heat transfer fluid already mentioned.

In a way that encourages and optimises the transfer of gaseous ozone into the carrier liquid, a part of the interior of the vessel is filled with a packing material, in bulk, which, in the context of this embodiment comprises Pall type rings. It should be noted in this regard that other types of bulk packing material could be used and particularly Raschig rings or partitioned rings. This packing material is contained at the top by an open-work plate 15 encouraging good distribution of the carrier liquid over the whole cross section of the vessel and, at the bottom by a support 16 which is also open-work. The inside of the pressurisation vessel is hence essentially divided into three zones: an upper zone in which distribution of the carrier liquid occurs, a middle zone containing the packing material and a lower zone in which the distribution of gaseous ozone occurs and the ozone saturated fluid is evacuated. The transfer of the ozone into the carrier liquid is thereby carried out in counter current.

It should be noted that the vessel can also be adapted so that the ozone/liquid transfer occurs in co-current.

So that a constant pressure is maintained inside the pressurisation vessel, it is equipped with a discharger 5 that arranges a continuous leaking of excess gas which has not dissolved in the carrier liquid. Vented gas recovered during operation of the discharger 5 is destroyed thanks to a thermal destructor 35.

The pressurisation vessel 1 is also fitted with a safety valve 17 and a manometer 18. It should finally be noted that the vessel also has a purge 19 in its upper part at the ozone inlet and a drainage device 20.

With the aim of keeping a constant level of liquid in the vessel 1, the installation is provided with regulation means 11. These regulation means are essentially made up of a control valve 12 provided on the carrier liquid inlet pipe 2 to the pressurisation vessel and means 13 for measuring the level of liquid inside this vessel. These measurement means 13 include a capacitive sensor able to determine the height of liquid in the vessel. The measurements taken by this sensor are transmitted via transmission means 14 to calculation means 21. These calculation means 21 are able to adjust the opening of the control valve 13 necessary to achieve the desired equilibrium.

While the installation is being used, it is therefore possible to regulate the pressure prevailing inside the pressurisation vessel by taking action, on the one hand on the undissolved gases and on the other hand on the quantity of carrier liquid entering the vessel. It has been possible to observe that the transfer efficiency increases with pressure (with a constant ratio of flow rates Qgas/Qliquid) because of the increase in solubility of ozone with pressure.

By way of example, one may provide for the establishment in the vessel of a pressure of from 2 to 10 bars. The flow rate ratio Qgas/Qliquid can be between 50 and 200% for purposes of information. The tests carried out on a prototype have shown that a plateau of dissolved ozone is reached for a ratio between 100 and 150%. The transfer efficiency appears to decrease approximately linearly with an increase of the Qgas/Qliquid ratio. For a constant concentration of ozone, it has been noted that the better efficiencies are obtained working at moderate pressure (4 bars) and low gas flow rather than at higher pressure (6 bars) and high gas flow.

Figure 2:
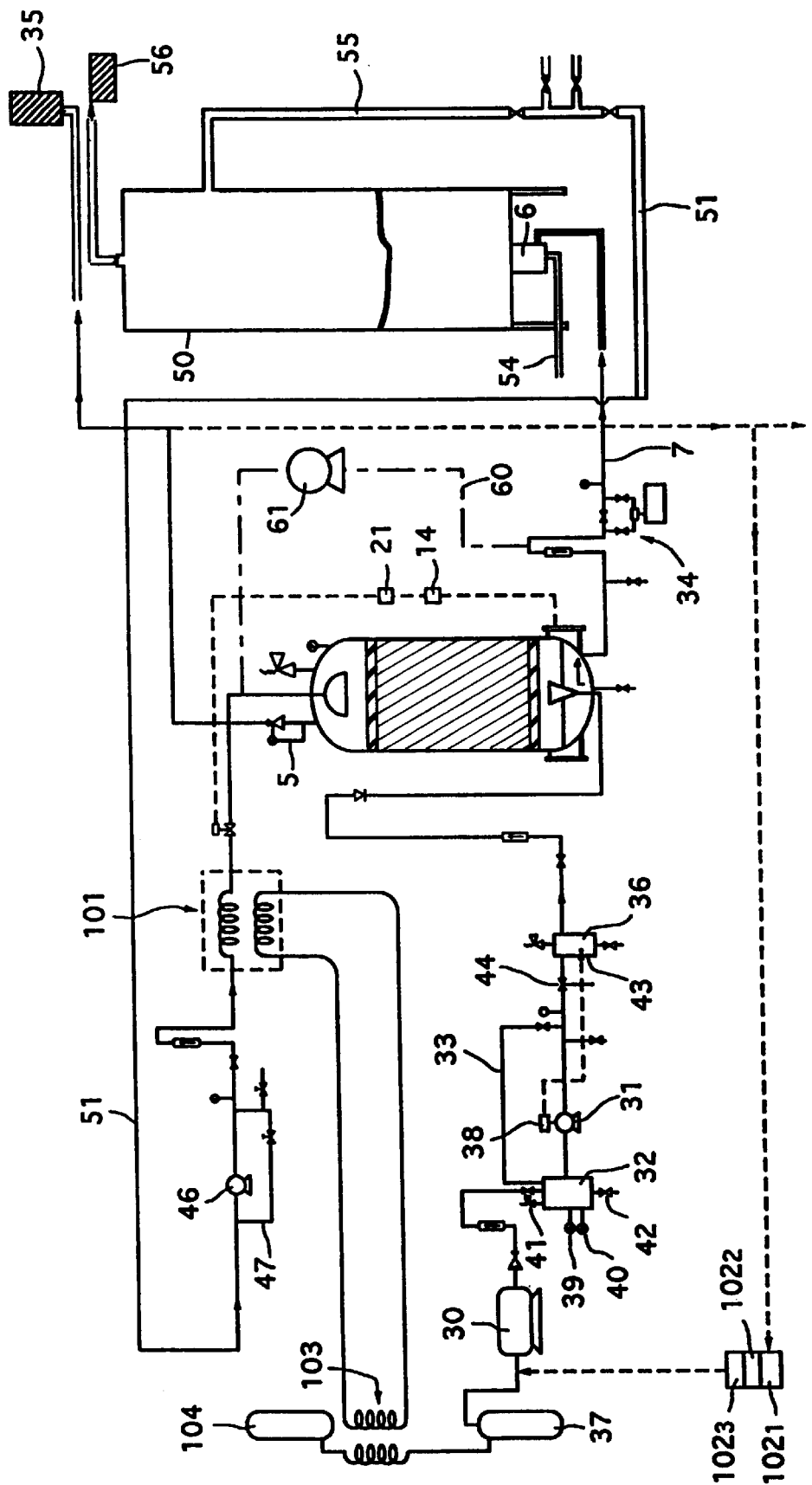
FIG. 2 shows a water treatment installation including the unit for the production of white water according to FIG. 1.
Figure 3A:
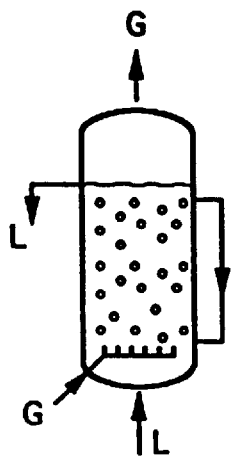
FIGS. 3A to 3D show different types of pressurisation vessels that may be used for the invention.
Figure 3B:
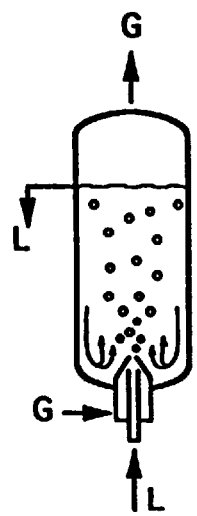
Figure 3C:
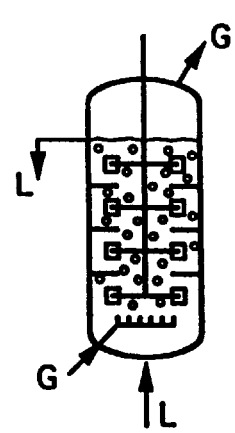
Figure 3D:
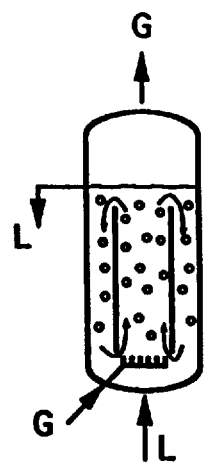

FIG. 2 shows diagramatically a unit for the treatment of water according to the invention according to a first embodiment with two stages. The unit includes mainly an installation for producing white water such as that described above with reference to FIG. 1 and a flotation reactor 50.

Such a treatment unit allows flotation to be carried out on water arriving at the flotation reactor 50 thanks to the white water supplied by the installation provided for this purpose. To this purpose, the unit includes means for reducing pressure 6 installed at the end of the pipeline 7 in the lower part of the flotation unit 50.

The pipeline 7 is not shown in its entire length but can have a length of several meters if needed. Such an arrangement allows the formation of ozonized white water at a point remote from the treatment installation, in the case of a distant reactor 50.

The means of reducing pressure 6 comprise in the present example, a cavitator allowing the conversion of the liquid under pressure leaving the vessel into ozonized white water. Tests carried out have allowed it to be established that the creation of bubbles of small diameter, typically less than 300 micrometers must take place through desorption from a medium supersaturated with gas. The micro-bubbles can then have a diameter between about 20 and 200 micrometers for a pressure inside the vessel of 3 to 6 bars and a pressure roughly equal to atmospheric pressure and the outlet of the cavitator.

The supply of water to be treated by this flotation unit 50 is ensured by the pipeline 54.

The ozone production installation used in the context of the unit shown in FIG. 2 includes, as well as the saturation vessel, an ozone generator 30 which permits the production of ozone from oxygen coming from an oxygen supply 37. The ozone generator used in the context of this example allows concentrations of ozone of the order of 100 to 150 g/Nm$_3$ to be obtained.

The installation includes, in addition, a membrane compressor 31 fitted with a frequency controller for the flow rate/pressure adjustment. Such a compressor allows a discharge pressure of the order of 7 bars.

A reservoir 32 fulfilling a buffering role upstream of the compressor allows fluctuations in flow to be smoothed out, as well as sudden changes in concentration that may arise at the outlet of the ozone generator 30. This reservoir which has a capacity of 20 liters is equipped with pressure indicators 39 and temperature indicators 40 while a pressure relief valve set at 1 bar ensures safety. This reservoir 32 is also fitted with a drainage valve which, if necessary allows part of the flow to be by-passed so as always to have a pressure between 0 and 0.1 bar relative pressure upstream of the compressor 31.

Start up of the compressor must on no account be carried out under load, the circuit is provided with a blow off loop 33 which permits discharge downstream of the compressor. A pressure indicator 42 is provided so as to allow control of the pressure at the outflow from this.

Finally, a vessel 36 ensures the safety of the compressor 31 and the ozone generator 30. This safety vessel 36 is fitted with a capacitive sensor 43 which is triggered in the presence of water. The purpose of this device is to form a non-return safety device so as to absolutely prevent any risk that water should go into the ozone generator which operates at high voltage. The triggering of the sensor 43 brings about the closing of an electronically controlled valve 44 situated between the vessel 36 and the compressor 31, the shut down of the frequency controller 38 and hence of the compressor and the shut down of the ozone generator 30. Such a vessel is, in addition, fitted with a pressure relief valve 45 allowing its own safety to be ensured.

The installation for the production of ozonized white water used also includes means 34 for measuring the ozone dissolved in the fluid under pressure leaving the pressurisation vessel.

The circuit supplying water to the pressurisation vessel 1 includes a pipeline 51 coming from the outlet of the flotation reactor 50. In effect, in the context of this example, the carrier liquid used by the pressurisation vessel is made up of a part of the treated water. To this end, the pipeline 51 is connected onto the outlet pipe 55 of the flotation unit 50.

The water circuit includes, in addition, a pump 46 and a blow off loop 47. The pump allows delivery of water at a pressure of 8 bars. To ensure good equilibrium of the fluids in the vessel, it is, in effect permanently necessary that the delivery pressure of the water should be greater than the pressure prevailing in the pressurisation vessel.

In an advantageous embodiment, the vessel is provided with means of recirculating the fluids brought into contact, namely the carrier liquid and/or the ozonized gas.

Hence, it is advantageous to recover the gaseous rejects, which still contain ozone and which can then be reused immediately at another point in the treatment chain or rerouted up stream of the ozone generator 30, successively through a destructor of residual ozone 102$_2$, a condenser (with purge) 102$_2$, and desiccation means (for example over alumina) 102$_3$, which allows recycling of the oxygenated gas.

The contact time of the carrier liquid with the ozone can for its part, be increased by providing a recirculation pipe 60 for a part of the treated flow into the vessel, with the help of a pump 61.

During the operation of the treatment unit shown, the white water production installation continuously supplies a fluid under pressure made up of water supersaturated with ozone. This fluid passes through pipeline 7 to the cavitator 6 installed at the foot of the flotation unit 50. The pressure reduction brought about by the cavitator allows the continuous release of micro-bubbles of ozone of very small size increasing the interface between the treated water and the oxidising gas and thereby optimising the action of the latter. The oxidising action of the ozone combined with the movement of the bubbles permits excellent flotation of the water present in the flotation unit to be carried out.

A catalytic destructor 56 is provided to eliminate ozone residues coming from the flotation unit. These ozone residues can also be recycled to the ozone generator as previously mentioned.

It is appropriate to note that the pressurisation vessel used may comprise a counter current packed column as shown in FIGS. 1 and 2 but may also comprise other types of columns.

With reference to FIG. 3, the pressurisation vessel used can particularly comprise a bubble column (A), an ejector column (B), a mechanically agitated column (C) or a bubble column using the air lift phenomenon (D).

Figure 4:
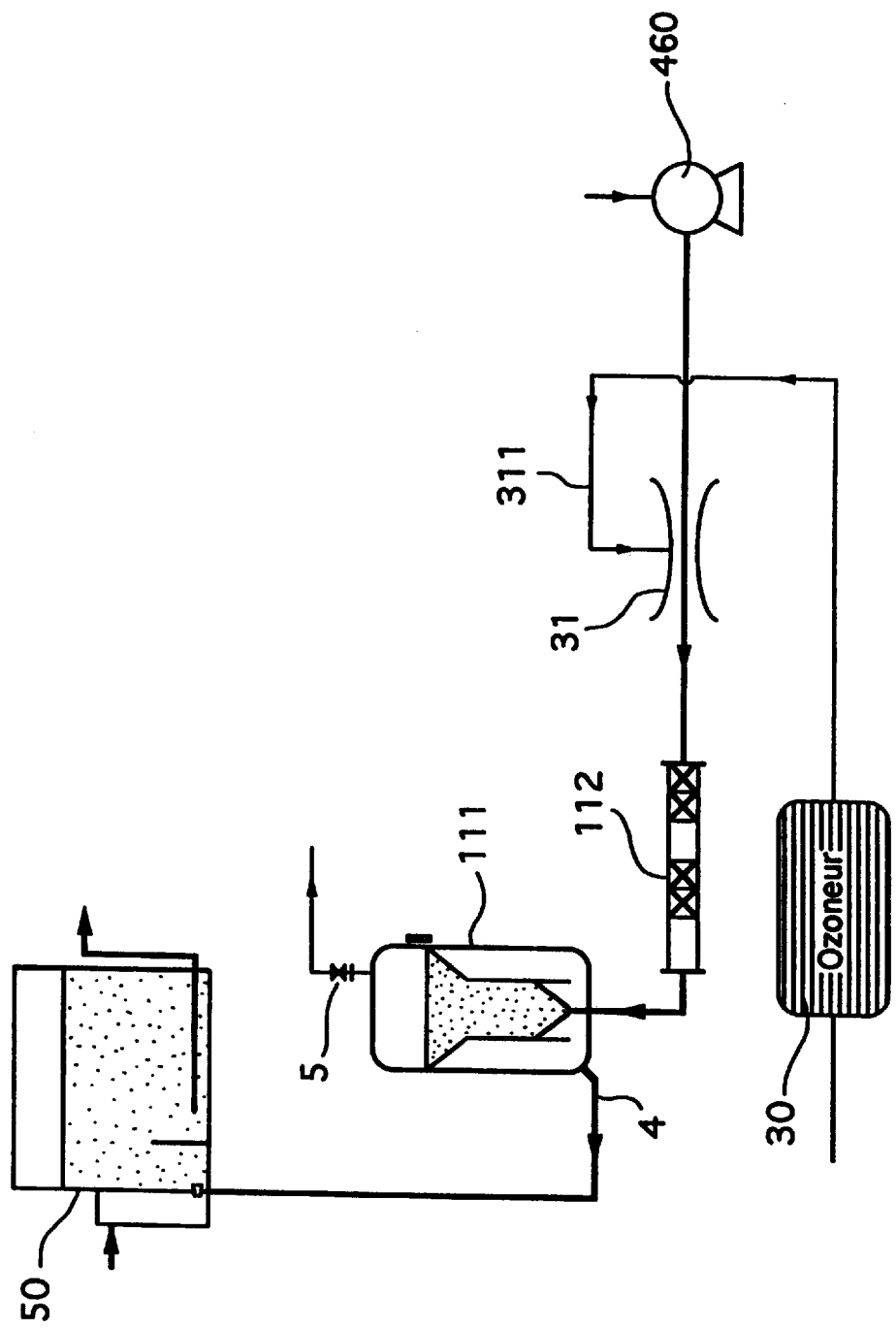
FIG. 4 shows another embodiment of a water treatment installation including a unit for producing white water with an ejector column and static mixer.

This pressurisation vessel can also comprise an ejector column 111 including a static mixer 112 such as that shown in FIG. 4.

In accordance to this Figure, the installation according to the invention includes an ozone generator 30 working with aspiration means 311 for the formed ozone and a liquid jet gas compressor 31. The carrier fluid is pumped by a pump 460, the intimate mixing of the gas and this liquid being carried out by a static mixer 112.

The embodiments of the invention described here do not have the object of reducing the scope of the invention. In particular it could be envisaged to carry out modifications to the components making up the installation for the production of the ozonized white water. It should be noted that the installation for the production of ozonized white water according to the invention is particularly appropriate to supply an ozoflotation unit such as that described and protected particularly by French patent No. 86 08780.

It could also be envisaged that such an installation could be used in a context other than that of a flotation unit.

With the installation for the production of ozonized white water according to the invention, concentrations of dissolved ozone greater than 20 mg/l of liquid can be attained and particularly up to, for example 80 g/l (achieved in a prototype).

We claim:

1. A water treatment unit for treating water by ozonization comprising:

an apparatus for the production of ozonized white water and a contactor which are made up of separate reactors connected by a pipeline; the contactor including means of reducing the pressure of the ozonized white water upstream of the contactor reactor;

the apparatus for the production of ozonized white water comprising means for the dissolution of ozone under pressure in a carrier liquid; the means of dissolution being made up of a pressurization vessel having an inlet for the carrier liquid, an inlet for ozone, an outlet for the fluid produced under pressure and means ensuring the regulation of the pressure inside the vessel and the continuous leakage of the gasses that did not dissolve in the carrier liquid;

the apparatus for the production of ozonized white water comprising an ozone generator and means of compressing or aspirating ozone formed by the ozone generator which are coupled to a flow tank, upstream of the compression or aspiration means, the flow tank defining means for compensating for fluctuations of flow and of pressure and sudden concentration variations at an outlet for the ozone generator;

the apparatus for the production of ozonized white water comprising means of cooling the gasses while dissolved in the carrier liquid before their introduction into said pressurization vessel;

the apparatus for the production of ozonized white water provided ozonized white water, under pressure, from the outlet in such a way that the mixture of water to be treated and the white water is made in the contactor.

2. A water treatment unit for treating water according to claim 1, wherein the pressurization vessel is a counter current packed column, an ejector column, an ejector column and static mixer, a bubble column, a bubble column using the air lift phenomenon, or a mechanically agitated bubble column.

3. A water treatment unit according to claim 2, wherein the means for reducing pressure is installed below a flotation unit.

4. A water treatment unit according to claim 1, further comprising means of regulating the height of liquid in the pressurization vessel.

5. A water treatment unit according to claim 4, wherein the means of regulating the height of liquid in the pressurization vessel comprise a control valve provided upstream of the carrier liquid inlet, a level detector provided in a lower part of the pressurization vessel, and means for transmitting measurements taken by the detector to the control valve.

6. A unit according to claim 1, wherein the contactor is provided with a pipeline allowing the pressurization vessel to be supplied with the water which is leaving the contactor and which is recycled to act as carrier liquid.

7. A unit according to claim 6, wherein filtration means are provided in the pipeline.

8. A water treatment unit according to claim 1, wherein the means ensuring regulation of the pressure in the vessel is a discharger, a pressure reducer, or a valve controlled by a pressure measurement.

9. A water treatment unit according to claim 1, wherein the pressurization vessel has in an upper part a diffuser of the carrier liquid and, in a lower part, a diffuser of gaseous ozone, the carrier liquid and ozone passing within the pressurization vessel in counter current.

10. A water treatment unit according to claim 2, wherein the pressurization vessel comprises a packing material encouraging the transfer of gaseous ozone into the carrier liquid.

11. A water treatment unit according to claim 1, further comprising a blow off loop provided between an outlet of the compression or aspiration means and the flow tank, the loop allowing discharge downstream of the compression or aspiration means and variation of flow within a desired range.

12. A water treatment unit according to claim 1, wherein the vessel is provided with means for recirculating a part of the carrier liquid from the outlet under pressure to the inlet of the vessel.

13. A water treatment unit according to claim 1, wherein the means of compression is a membrane compressor, a dry compressor, or a liquid ring pump.

14. A water treatment unit according to claim 1, further comprising means of measuring the ozone dissolving in the liquid under pressure leaving the pressurization vessel.

15. A water treatment unit according to claim 1, wherein the means of cooling the gases before their introduction into the vessel are made up of an exchanger supplied by a coolant fluid coming from another exchanger recovering cold released by the gasification of liquid oxygen.

16. A water treatment unit according to claim 1, wherein the means of pressure reduction is a cavitator or a spray nozzle.

17. A unit according to claim 1, further comprising means for the destruction or for the recycling or for the re-use of residual gaseous ozone coming from the contactor and the vessel for production of ozonized white water.

18. A unit according to claim 1, wherein the contactor is a separation reactor, a binding reactor, a flotation reactors or an ozoflotation reactor.

19. A water treatment unit according to claim 1, wherein the contactor operates under pressure greater than atmospheric pressure but less than the pressure of the fluid leaving the pressurization vessel.

20. A water treatment unit according to claim 1, wherein the means for reducing pressure is installed at the end of the pipeline and upstream from the contactor reactor.

* * * * *